Figure 1:
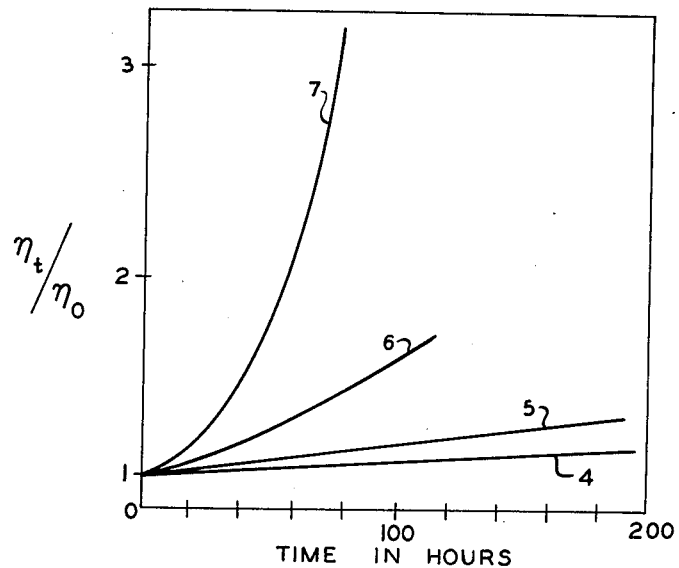

United States Patent Office 3,200,104
Patented Aug. 10, 1965

3,200,104
METHOD OF MAKING FULLY HYDROLYZED POLYVINYL ALCOHOL PRODUCTS
Kiyokazu Imai, Kurashiki, Unpei Maeda, Sozya, and Masakazu Matsumoto, Kurashiki, Japan, assignors to Kurashiki Rayon Co., Ltd., a corporation of Japan
Filed Dec. 15, 1960, Ser. No. 75,948
Claims priority, application Japan, Dec. 15, 1959,
34/39,236
4 Claims. (Cl. 260—91.3)

This invention relates to a method of producing polyvinyl alcohol by polymerizing vinyl esters to give polyvinyl esters which are then converted to polyvinyl alcohol. It relates especially to a method in which reaction media of a particular nature are employed.

Various procedures are known in the art for polymerizing vinyl esters in the presence of catalysts to give polyvinyl esters, which are then converted to polyvinyl alcohol. Aqueous solutions of the polyvinyl alcohol obtained by these conventional procedures, however, are known to be unstable, gradually increasing in viscosity until the solutions become gelatinized. This is a disadvantage when polyvinyl alcohol is used for purposes such as pastes or adhesive materials. Various modifications have been employed to overcome this defect. For example, methods have been proposed which use a co-polymer or a partially-saponified ester.

Numerous techniques have also been developed for forming polyvinyl alcohol from polyvinyl esters. A method commonly employed involves alcoholysis with an alcohol such as methanol or ethanol using a strong base or acid as catalyst. When a reaction medium is employed in which the polyvinyl alcohol formed is insoluble, for example an alcohol medium, the polyvinyl alcohol precipitates during the course of the reaction with the result that the precipitated polyvinyl alcohol is not uniform. The polyvinyl alcohol thus produced usually contains residual acetyl groups in the amount of about 0.1 mole percent. Moreover, when it is desired to obtain a partially-acetylated polyvinyl alcohol, the degree of hydrolysis of the precipitate depositing at an earlier period differs from the degree of hydrolysis of the precipitate depositing at a later period so that there is a lack of uniformity of the product formed throughout the process. Also the transparency of the aqueous solutions of the polyvinyl alcohol thus obtained is not good.

An object of the invention is to provide an improved process for the production of polyvinyl alcohol.

Another object of the invention is to provide a reaction medium for the polymerization of vinyl esters to polyvinyl esters which can be converted to polyvinyl alcohol having improved properties.

Still another object of the invention is to provide a reaction medium for the conversion of polyvinyl esters to polyvinyl alcohol wherein the conversion will proceed uniformly and polyvinyl alcohol having improved properties will be obtained.

In accordance with the present invention a vinyl ester is polymerized in the presence of a catalyst in a reaction medium which is an organic solvent having a dipole moment of at least 2.5. When such solvents are employed as reaction media, the polymerization may be conducted in a simple, economical, efficient and non-hazardous manner. The polyvinyl ester thus obtained is converted to polyvinyl alcohol having a high degree of polymerization which will be stable and which will not gelatinize even on standing for long periods of time.

We have discovered that the nature of the reaction medium has an important influence on the polymerization process, and especially on the properties of the polyvinyl alcohol which is formed from the resulting polymerized vinyl ester. We have found that the polyvinyl alcohol which has been formed from a polyvinyl ester which was polymerized using an organic reaction medium of the character indicated will be stable and will not gelatinize on standing. Another advantage is that the polyvinyl alcohol so obtained will have a high degree of polymerization. This is true even when an excess of solvent is used.

We have also discovered that the nature of the reaction medium has an important influence on the conversion of polyvinyl esters to polyvinyl alcohol and on the polyvinyl alcohol formed thereby. We have found that when the polyvinyl acetate is reacted in an organic solvent medium of the type specified, which is a solvent for the polyvinyl alcohol to be produced, the reaction proceeds uniformly and the polyvinyl alcohol thus produced contains residual acetyl groups in an amount less than 0.02 mole percent.

The present invention is applicable to the polymerization of vinyl esters which are soluble in the organic solvent reaction medium. Thus the method is applicable not only to the commonly used vinyl acetate, but also to other esters of vinyl alcohol, so as to provide, on hydrolysis of the ester, a polyvinyl alcohol having equally good physical properties. Suitable esters are those represented by the formula $CH_2=CHOCOR$ in which R is a hydocarbon radical which may be either alkyl or aryl, e.g. a lower alkyl group such as an alkyl group containing 1 to 4 carbon atoms, or a phenyl group. Thus, vinyl esters which can be polymerized in accordance with this invention include vinyl formate, vinyl acetate, vinyl propionate, vinyl butyrate, vinyl stearate, vinyl benzoate, and the like. In an especially preferred embodiment of the present invention, vinyl acetate is polymerized to form improved polyvinyl acetate.

An advantage of the use of the organic solvent reaction media of this invention in the polymerization is that they readily dissolve esters of polyvinyl alcohol and organic acids which contain the aryl group and which are insoluble in the solvents, such as methanol and ethanol, customarily used as reaction media for carrying out the polymerization of vinyl esters.

Solvents falling within the scope of this invention include organic liquid sulfoxides, alkylene carbonates, saturated aliphatic nitriles, acid anhydrides, such as acetic anhydride, and ketones, such as acetone.

The organic liquid sulfoxides which have been found suitable as the reaction media for conducting the polymerization reaction are, like the other solvents having a dipole moment of at least 2.5, those which are liquid at reaction temperatures and contain no functional or reactive groups. The preferred liquid organic sulfoxides may be designated by the formula

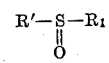

wherein R' and $R_1$ may be the same or different hydrocarbon radicals, or may represent methylene groups which are bonded together to form a ring structure, as in tetramethylene sulfoxide. Suitable organic liquid sulfoxides include dimethyl sulfoxide, diethyl sulfoxide, methyl ethyl sulfoxide, tetramethylene sulfoxide and the like. It is preferred to use a sulfoxide having a shorter carbon chain since the degree of polymerizaton of the resulting polymer decreases as the number of carbon atoms in the alkyl group increases.

The liquid organic sulfoxide reaction medium can be readily recovered by distillation and recycled. There is essentially no loss of organic sulfoxide due to decomposition. The liquid organic sulfoxide may contain small amounts of water, e.g., less than 1%, although the presence of too much water might tend to produce undesirable side reactions.

The alkylene carbonates employed as reaction media are advantageously lower alkylene carbonates such as ethylene carbonate and propylene carbonate, and the saturated aliphatic nitriles employed are preferably lower saturated aliphatic nitriles of the formula R″CN where R″ is an alkyl radical having 1-4 carbon atoms, for example, acetonitrile, propionitrile, butyronitrile, and the like. With higher saturated aliphatic nitriles, the polyvinyl alcohol produced by the invention tends to have a somewhat lower degree of polymerization.

Generally the vinyl ester is polymerized by heating in a solution of the organic reaction medium to which an appropriate amount of a polymerization catalyst or initiator has been added.

The solution polymerizations of this invention are carried out employing known polymerization initiators as well as conventional polymerization temperatures and times. Free radical polymerization initiators as exemplified by benzoyl peroxide, acetyl peroxide, 2,2′-azodiisobutyronitrile are preferably employed in carrying out the invention. Polymerization activation by means of light, e.g. ultraviolet radiation, can be used alone or together with the above polymerization initiators. The reaction temperature can vary widely and will depend upon a variety of factors, including the specific reactants employed, the particular liquid organic reaction medium used, and the degree of polymerization desired. Polymerization temperatures of the order of 0° to 100° C. are generally suitable although temperatures outside this range can be employed. Polymerization times of the order of several minutes, for example, fifteen minutes to a week or so can be used.

The amount of solvent used in the polymerization can vary over a wide range. Generally the use of the solvent in amounts of about 15 to 85 parts per 100 parts by weight of the combined monomer and solvent and preferably 20 to 70 parts is suitable.

It is an advantage of this invention that, since the boiling point of many of the reaction media, such as the organic sulfoxides, is high and the vapor pressure of polymers containing a large quantity of this solvent is low, polymerization can generally be carried out at a relatively high temperature.

Pressure does not appear to be a parameter of this reaction, and the reaction, therefore, is preferably conducted at atmospheric pressure, although elevated pressures may be used to obtain slight improvements in conversions.

The resulting polyvinyl ester may be recovered and converted to polyvinyl alcohol according to conventional procedures. Generally, alkaline catalyzed alcoholysis is preferred to prepare such improved polyvinyl alcohol. Lower alcohols such as methanol and ethanol are suitably used in such techniques. Alkaline catalysts such as sodium hydroxide and sodium methylate are advantageously employed. The method by which the polyvinyl ester is recovered will depend primarily upon the physical nature of the reaction mixture. However, it is an advantage of this invention that the polyvinyl ester polymer need not be recovered from the solution of organic reaction medium before conversion to the polyvinyl alcohol. Any unreacted monomer may be removed by stripping from the solution by distillation with the aid of a stripping agent, such as nitrogen or methanol, leaving the polymer in the solvent. This solution can be directly subjected to the hydrolysis reaction, if desired.

Thus, according to one aspect of the present invention, reaction of the polyvinyl esters to form polyvinyl alcohol can be carried out in a reaction medium containing an organic solvent having a dipole moment of at least 2.5, such as an organic sulfoxide, as described above, which is a solvent for polyvinyl alcohol. An advantage of such a solvent such as organic sulfoxide solvents, is that they will readily dissolve polyvinyl alcohol esters of organic acids containing the aryl group. Hydrolysis of these polyvinyl alcohol esters will give polyvinyl alcohol having equally good properties as the poyvinyl alcohol obtained from polyvinyl acetate.

The reaction temperature will depend upon a variety of factors including the specific reactants employed and the particular liquid organic solvent used. Generally, the hydrolysis is conducted at a temperature of about 50° to 60° C.

The polyvinyl alcohol is recovered in substantially quantitative amount from the reaction mixture by precipitation with a solvent such as acetone.

The hydrolysis of polyvinyl ester can be carried out by direct saponification with one equivalent of alkali for each equivalent of ester. The acid formed in the reaction reacts irreversibly with the catalyst to form a salt and water. This illustrated by the the following formula using polyvinyl acetate:

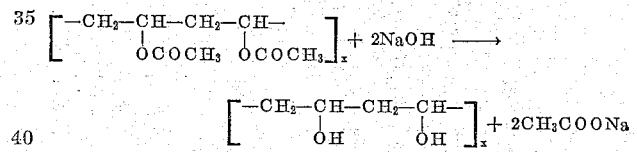

When the polyvinyl ester is saponified in the presence of an organic solvent having a dipole moment of at least 2.5, such as an organic sulfoxide or one of the other solvents described above, the reaction may be somewhat slow since the reaction is limited to direct saponification with the alkali, in which the acid formed reacts irreversibly with the catalyst to form a salt and water, thus consuming the catalyst. However, the hydrolysis reaction can be accelerated by employing a base or acid catalyzed alcoholysis reaction. This is illustarted by the following formula, using polyvinyl acetate and methanol:

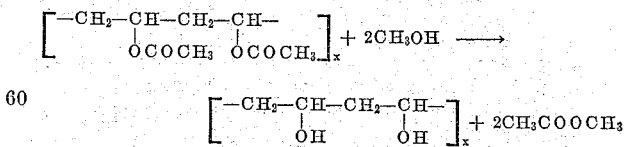

If the quantity of co-existing alcohol is large, gelation occurs at a later stage of the reaction, but the reaction will proceed uniformly by raising the temperature. For example, with one part of polyvinyl acetate, 20 parts of dimethyl sulfoxide and 10 parts of methanol, gelation occurs at a later stage of the reaction at 20° C., but the reaction proceeds uniformly at temperatures above 40° C.

In the case of a hydrolysis using dimethyl sulfoxide as a solvent and employing a basic material, acetic acid may be added during the course of the hydrolysis to neutralize the catalyst and stop the reaction at a desired degree of hydrolysis. For example, a polyvinyl alcohol of a 90% degree of hydrolysis was obtained by adding acetic acid during the course of the hydrolysis reaction and plunging the reacted material into a large quantity of methanol. An aqueous solution of a polyvinyl alcohol made in this manner had better transparency, when compared with a partially hydrolyzed product obtained by customary procedure, and a uniform distribution of the degree of hydrolysis.

In an especially preferred practice of the invention both the polymerization and the subsequent hydrolysis are carried out in the organic solvent having a dipole moment of at least 2.5 although, as specified above, saponification may be carried out in the presence of conventional saponification solvents, such as methanol or ethanol, in accordance with conventional techniques. We prefer to use the same organic solvent both in polymerization and saponification, since this technique affords the advantages of giving as a product a substantially non-gelling, as well as a fully hydrolyzed polyvinyl alcohol. In effecting the novel saponification procedure of this invention we most advantageously employ an organic sulfoxide. It will be obvious, however, that conventional polymerization techniques can be combined with the novel hydrolysis or saponification method of this invention, just as the conventional hydrolysis procedures can be combined with the novel polymerization methods described above.

The invention will be further understood from the following specific examples of practical application. However, it will be understood that these examples are not to be construed as limiting the scope of the present invention in any manner. In these examples, all parts are by weight, unless otherwise indicated.

EXAMPLE 1

Thirty parts of vinyl acetate was polymerized in 70 parts of dimethyl sulfoxide at 60° C., using azoisobutyronitrile as catalyst. The polymer obtained was hydrolyzed by a conventional method. A 15% aqueous solution of this polyvinyl alcohol, having a degree of polymerization of 1650, showed no change in viscosity whatsoever after being kept for 100 hours at 30° C. On the other hand, a 15% aqueous solution of polyvinyl alcohol having a degree of polymerization of 1645, obtained by the polymerization of polyvinyl acetate in an aqueous solution of methanol, was unstable. The viscosity of the solution increased on standing at 30° C. and after 50 hours the solution became gelatinized.

EXAMPLE 2

Thirty parts of vinyl acetate was polymerized by heating with 0.01 part of azoisobutyronitrile in 70 parts of dimethyl sulfoxide in a sealed tube at 60° C. for 40 hours. A 95% yield of polyvinyl acetate having an average degree of polymerization of 2960 was obtained. The resulting polyvinyl acetate was dissolved in methanol and hydrolyzed by base catalyzed alcoholysis by conventional procedures. The polyvinyl alcohol obtained had an average degree of polymerization of about 1700. A 15% aqueous solution of this polyvinyl alcohol was very stable and did not gelatinize after 3 days at 30° C.

EXAMPLE 3

One gram of polyvinyl acetate was dissolved in 20 cc. of dimethyl sulfoxide and to this solution was added 10 cc. of a solution of normal sodium hydroxide in methanol. The mixed solution was kept at 60° C. for one hour and then sufficient acetone was added to precipitate the polyvinyl alcohol completely. The polyvinyl alcohol obtained had only 0.017 mole percent of residual acetyl groups.

EXAMPLE 4

Three-tenths gram of polyvinyl benzoate was dissolved in 20 cc. of dimethyl sulfoxide and to this solution was added 10 cc. of a solution of 0.5 normal sodium hydroxide in methanol. The mixed solution was kept at 50° C. for 2 hours. A large quantity of acetone was then added to precipitate the polyvinyl alcohol. The reaction solution contained 0.08 g. of polyvinyl alcohol. The ultraviolet spectrum of an aqueous solution of the polyvinyl alcohol thus obtained showed that the benzoate group was almost completely absent and the residual benzoate ester group in the polyvinyl alcohol was estimated to be less than 0.2 mole percent.

EXAMPLE 5

Polyvinyl acetate is prepared by the method described in Example 1. The unreacted monomer is stripped from the polymerization reaction mixture. To the resulting solution of polymer in dimethyl sulfoxide is added 520 cc. of dimethyl sulfoxide and 285 cc. of a solution of 1 normal sodium hydroxide in methanol.

The resulting polyvinyl ester solution is alcoholyzed as described in Example 3. The product polyvinyl alcohol is substantially completely hydrolyzed and exhibits high stability in aqueous solution.

EXAMPLE 6

Polyvinyl acetate was obtained by polymerizing a predetermined quantity of vinyl acetate, solvent and azo-bis-isobutyronitrile (AIBN) in a sealed tube at 60° C. for a predetermined time as shown in Table I, and the polyvinyl acetate thus obtained was dissolved in methanol and saponified according to the conventional process of alkaline saponification and subjected to treatment to reduce the remaining acetate groups and produce polyvinyl alcohol. A dilute solution of the polyvinyl alcohol in 40% water containing dimethyl sulfoxide became gradually white turbid when left at room temperature, but it was found that the product $t_{1/2} \cdot P_A^{0.6}$, of the time $t_{1/2}$ required for the turbidity of the solution to reach ½ its equilibrium value, multiplied by $P_A^{0.6}$, where $P_A$ represents the degree of polymerization of polyvinyl alcohol, shows a good relative relation to the degree of swelling of polyvinyl alcohol film in water (see Kobunshi Kagaku (Chemistry of High Polymers, Japan), 16, 449 (1959)). Moreover, the value $t_{1/2} \cdot P_A^{0.6}$ corresponds very well to the nature of gelation of an aqueous solution of polyvinyl alcohol and the larger this value is, the less the gelation (see Example 7). Accordingly, in this example, instead of determining the stability of viscosity of a concentrated aqueous solution of polyvinyl alcohol, a solution of polyvinyl alcohol of 3 g./l. concentration in 40% hydrous dimethyl sulfoxide solution was prepared and the time of turbidity $t_{1/2}$ of this solution at 30° C. was determined. The relation between $t_{1/2} \cdot P_A^{0.6}$ of various polyvinyl alcohols produced by the polymerization of vinyl esters in dimethyl sulfoxide, ethylene carbonate, propylene carbonate, acetonitrile, acetic anhydride, propionitrile, acetone, ethyl acetate, benzene, cyclohexane, n-hexane, acetic acid, methanol, cyclohexanol, hydrous methanol and hydrous acetic acid, and the dipole moment of each polymerization medium is shown in Table I, in which various concentrations of the polymerization medium, e.g. 30% and 60% by weight are used. In all of these cases, a relationship is seen among them and the same relationship would be expected in the case of infinite dilution. At any rate, it is apparent that polyvinyl alcohols produced in a solvent having a dipole moment greater than 2.5 have greater $t_{1/2} \cdot P_A^{0.6}$ than ordinary polymers obtained by polymerization in a conventional ethyl acetate or methanol solution, or by bulk polymerization, and accordingly they resist gelation.

In the tests described in Table I, the charge was 20 grams and the polymerization temperature was 60° C. in all cases.

Table I

| Test No. | Solvent | Dipole Moment (Debye unit) | Dielectric constant (CGS, ESU) | Amount (Wt. percent) | AIBN (Percent) | Polymerization time (hr.) |
|---|---|---|---|---|---|---|
| 1 | Dimethyl sulfoxide | c 4.47 | 45 | 70 / 30 | 0.03 / 0.01 | 7 / 3.5 |
| 2 | Ethylene Carbonate | 4.80 | 69 | 60 / 30 | 0.02 / 0.01 | 3.5 / 3.5 |
| 3 | Acetonitrile | 3.51 | 39 | 30 / 30 | 0.01 / 0.01 | 7.5 / 2.2 |
| 4 | Acetic anhydride | 2.64 | 21 | 60 / 30 | 0.02 / 0.01 | 5 / 4 |
| 5 | Propionitrile | 3.66 | | 30 | 0.01 | 3.2 |
| 6 | Acetone | 2.74 | 21 | 30 | 0.01 | 1.8 |
| 7 | Ethyl acetate | 1.82 | 6.1 | 30 / 60 / 30 | 0.005 / 0.01 / 0.03 | 2.5 / 3 / 3 |
| 8 | Benzene | 0 | 2.3 | 30 / 50 / 70 | 0.06 / 0.1 | 6.4 / 12.8 |
| 9 | Cyclohexane | 0 | 2.0 | 30 | 0.01 | 2.2 |
| 10 | n-Hexane | 0 | 1.9 | 30 | 0.005 | 8 |
| 11 | Acetic acid | 1.74 | 6.3 | 33 | 0.005 | 2 |
| 12 | Methanol | 1.65 | 31 | 30 / 30 | 0.01 / 0.02 | 0.55 / 31.2 |
| 13 | Cyclohexanol | 1.69 | 15 | 30 | 0.01 | 8 |
| 14 | 30% hydrated methanol | (a) | (b) | 30 | 0.005 | 2 |
| 15 | 40% hydrated methanol | (a) | (b) | 50 | 0.005 | 2 |
| 16 | 50% hydrated methanol | (a) | (b) | 80 | 0.0098 | 6.2 |
| 17 | 30% hydrated acetic acid | (a) | (b) | 33 | 0.05 | 2 |
| 18 | 50% hydrated acetic acid | (a) | (b) | 75 | 0.01 | 5 |
| 19 | None | | | | 0.005 | 4 |

| Test No. | Solvent | Conversion (Percent) | $P_{AC}$ d | $P_A$ | $t_{1/2} \cdot P_A^{0.6} \times 10^{-3}$ | Degree of Swelling in water at 30° C. |
|---|---|---|---|---|---|---|
| 1 | Dimethyl sulfoxide | 84.6 / 37.3 | 3,460 / 7,240 | 1,940 / 3,360 | 17.5 / 10.1 | 7.46 / 5.98 |
| 2 | Ethylene Carbonate | 49.0 / 39.9 | 2,535 / 5,325 | 1,720 / 3,080 | 12.24 / 10.04 | |
| 3 | Acetonitrile | 15.3 / 10.6 | 658 / 2,050 | 908 / 2,050 | 8.32 / 8.26 | 4.49 |
| 4 | Acetic anhydride | 50.6 / 28.5 | 824 / 2,615 | 899 / 2,280 | 6.39 / 6.18 | |
| 5 | Propionitrile | 60.2 | | 460 | 5.68 | |
| 6 | Acetone | 11.7 | 984 | 1,150 | 5.18 | 3.29 |
| 7 | Ethyl acetate | 9.9 / 12.2 / 11.0 | 1,330 | 2,515 / 1,370 / 3,695 | 5.00 / 4.01 / 3.17 | 2.55 / 2.66 |
| 8 | Benzene | 18.9 / 33.2 | 904 | 2,255 / 1,030 | 2.59 / 1.93 | |
| 9 | Cyclohexane | 16.7 | 1,560 | 1,565 | 2.97 | 2.41 |
| 10 | n-Hexane | 21.5 | 1,320 | 1,335 | 2.70 | |
| 11 | Acetic acid | 11.7 | 3,715 | 3,035 | 2.86 | |
| 12 | Methanol | 3.9 / 88.5 | 2,065 / 1,080 | 2,060 / 1,140 | 2.53 / 2.56 | 2.23 |
| 13 | Cyclohexanol | 39.7 | 407 | 528 | 1.95 | |
| 14 | 30% hydrated methanol | 17.0 | | 2,470 | 2.14 | |
| 15 | 40% hydrated methanol | 19.8 | | 2,035 | 1.74 | |
| 16 | 50% hydrated methanol | 59.5 | 1,020 | 1,020 | 1.44 | 1.82 |
| 17 | 30% hydrated acetic acid | 11.7 | 3,190 | 2,800 | 1.87 | |
| 18 | 50% hydrated acetic acid | 62.5 | 1,190 | 1,135 | 1.50 | 1.87 |
| 19 | None | 2.8 | 9,760 | 4,480 | 3.90 | 2.57 | a 1.9 for water.
b 79 for water.
c Value of diethyl sulfoxide.
d $P_{AC}$, degree of polymerization of polyvinyl acetate.

EXAMPLE 7

Polyvinyl acetate was prepared by polymerizing a predetermined quantity of vinyl acetate, solvent and AIBN in a sealed tube at 60° C. for a predetermined time, as shown in Table II. The polyvinyl acetate thus prepared was converted to polyvinyl alcohol by the process described in Example 6. The polyvinyl alcohol was used to prepare aqueous solutions having concentrations of 11 to 12% or 14 to 15%, the change in viscosity with time of these solutions was determined by the falling ball method at 30° C.

Figure 2:
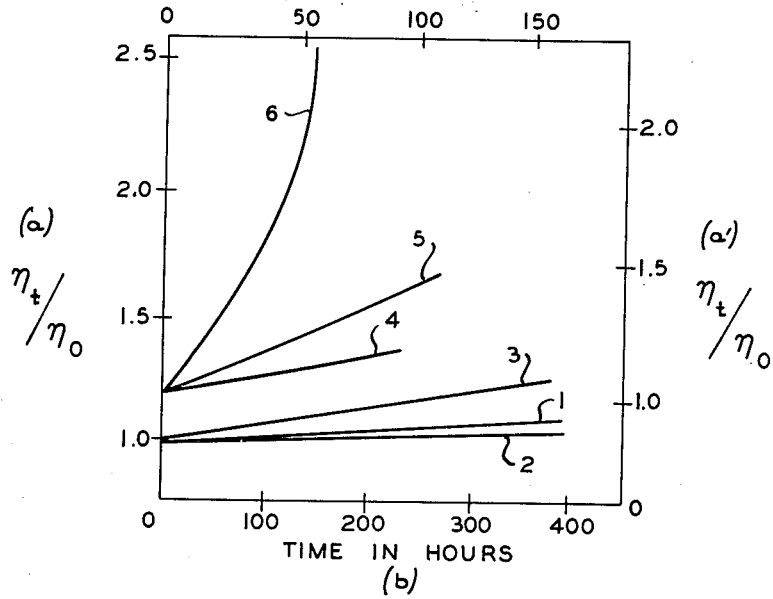

The results thus obtained are shown in FIGS. 1 and 2.

Referring to these figures, curves were drawn by plotting the time (hr.) on the abscissa and the relative viscosity ($\eta_t/\eta_0$) on the ordinate to illustrate the relation between time and relative viscosity in connection with each sample. The symbols $\eta_0$ and $\eta_t$ designate the viscosity of the aqueous solution after standing for times 0 and $t$, respectively. The properties of aqueous solutions of polyvinyl alcohol shown by different curves in FIGS. 1 and 2 are as follows:

| In Fig. 1 | Concentration (percent) of Polyvinyl alcohol | $\eta_0$ (poise) |
|---|---|---|
| Sample No.: | | |
| 4 | 11.39 | 16.5 |
| 5 | 11.89 | 40.8 |
| 6 | 11.86 | 27.0 |
| 7 | 11.84 | 11.0 |

| In Fig. 2 | Concentration (percent) of Polyvinyl alcohol | $\eta_0$ (poise) |
|---|---|---|
| Sample No.: | | |
| 1 | about 15 | 73.6 |
| 2 | about 15 | 136 |
| 3 | about 15 | 40.3 |
| 4 | 14.22 | 36.4 |
| 6 | 14.47 | 63.2 |

α in Table II represents the angle of inclination of each of the straight lines in FIGS. 1 and 2. Though the amounts of the solvents used in these examples are not relatively fixed to each other, yet it can be seen that the polyvinyl alcohols obtained by using ethylene carbonate, acetonitrile, acetic anhydride, or acetone, which have a large dipole moment, are small in angle α when compared with polymers obtained in a conventional methanol solution, and they have a higher resistance to gelation.

In Table II, the polymerization temperature was 60° C. in all cases and the measurements of viscosity changes with time were effected at 30° C.

In FIG. 2, the straight lines 1, 2 and 3 are based on ordinate (a) and abscissa (b), while curves 4, 5 and 6 are based on ordinate (a′) and abscissa (b′).

by-product to butyric acid, and a Soxhlet extraction was effected by means of methanol. The turbidity time $t_{1/2}$ of the purified polyvinyl alcohol thus prepared was determined in the manner referred to in Example 6, and the results as shown in Table III. As is apparent from Table III, the $t_{1/2} \cdot P_A^{0.6}$ of the polyvinyl alcohol obtained by using as polymerization solvent, ethylene carbonate, dimethyl sulfoxide, or acetic anhydride, which have a dipole moment greater than 2.5 is larger than that of the polymers obtained by conventional bulk polymerization or by using methanol solution. Accordingly, it will be apparent that, as pointed out with reference to Example 6, an aqueous solution of high concentration of a polyvinyl alcohol obtained by using a solvent having a large dipole moment is much more difficult to gel as com-

Table II

| Test No. | Solvent | Dipole moment | Amount (Wt. percent) | AIBN (percent) | Polymerization time (hr.) | Conversion (percent) |
|---|---|---|---|---|---|---|
| 1 | Dimethyl sulfoxide | b 4.47 | 70 | 0.03 | 40 | 95 |
| 2 | Ethylene carbonate | 4.80 | 60 | 0.01 | 6.0 | 53 |
| 3 | Acetonitrile | 3.51 | 30 | 0.01 | 4.8 | 47 |
| 4 | Acetic anhydride | 2.64 | 45 | 0.01 | 5.0 | 43 |
| 5 | Acetone | 2.74 | 29 | 0.007 | 5.0 | 29 |
| 6 | Methanol | 1.65 | 20 | | | 50 |
| 7 | 40% hydrated methanol | | 50 | 0.005 | 15.0 | 76 |

| Test No. | Solvent | $P_{AC}$ | $P_A$ | $\alpha \cdot 10^3$ (hr.⁻¹) 14–15% a | $\alpha \cdot 10^3$ (hr.⁻¹) 11–12% a | $t_{1/2} \cdot P_A^{0.6} \times 10^{-3}$ (hr.) | Degree of Swelling in water at 30° C. |
|---|---|---|---|---|---|---|---|
| 1 | Dimethyl sulfoxide | 3,090 | 1,700 | 0.32 | | 15.90 | 8.16 |
| 2 | Ethylene carbonate | 2,740 | 2,050 | 0.29 | | 13.20 | 6.19 |
| 3 | Acetonitrile | 1,720 | 1,630 | 0.73 | | 8.02 | |
| 4 | Acetic anhydride | 1,560 | 1,465 | 1.87 | 0.76 | 5.44 | 4.25 |
| 5 | Acetone | 1,905 | 1,965 | 4.34 | 1.67 | 4.30 | |
| 6 | Methanol | 2,105 | 1,670 | 15.06 | 5.11 | 2.75 | 2.62 |
| 7 | 40% hydrated methanol | 1,695 | 1,405 | | 10.0 | 1.53 | 2.13 | a Concentration of polyvinyl alcohol.
b Value of diethyl sulfoxide.

EXAMPLE 8

Polyvinyl butyrate was prepared by polymerizing a predetermined quantity of vinyl butyrate, solvent and AIBN in a sealed tube at a temperature of 60° C. for a predetermined time, as shown in Table III, and the polyvinyl butyrate thus obtained was dissolved in a mixed solvent consisting of equal volume parts of methanol and acetone to prepare a 5% solution in each case. To this solution was added methanolic 1N-NaOH in the ratio of 2 volumes of the solution to 1 volume of the latter and the mixture was maintained at 50° C. for 2 hours to effect saponification. The polyvinyl alcohol thus obtained was dipped in methanolic N/5-NaOH at room temperature overnight to reduce the number of remaining ester groups and was then dipped in a large quantity of a mixed solution of acetic acid (1 volume) and methanol (4 volumes) to convert the sodium butyrate produced as pared with polymers obtained by conventional bulk polymerization or by using a methanol solution.

In Table III polymerization was effected at 60° C. and the solvent concentration was 30° by weight.

Table III

| Solvent | Dipole moment | AIBN (percent) | Polymerization time (hr.) | Conversion (percent) | (η) 30° C. Acetone (dl./g.) | $P_A$ | $t_{1/2} \cdot P_A^{0.6} \times 10^{-2}$ |
|---|---|---|---|---|---|---|---|
| Ethylene carbonate | 4.80 | 0.02 | 3.0 | 65 | 0.663 | 415 | 10.53 |
| Dimethyl sulfoxide | a 4.47 | 0.01 | 5.5 | 66 | 0.497 | 458 | 9.26 |
| Acetic anhydride | 2.64 | 0.02 | 6.0 | 76 | 0.412 | 374 | 8.26 |
| None | | 0.01 | 10.0 | 49 | 0.760 | 414 | 6.88 |
| Cyclohexane | 0 | 0.02 | 5.5 | 66 | 0.358 | 346 | 5.73 |
| Methanol | 1.65 | 0.02 | 5.5 | 74 | 0.325 | 355 | 4.8 |
| 50% hydrated acetic acid | | 0.01 | 4.5 | 59 | 0.424 | 449 | 4.8 |
| 30% hydrated methanol | | 0.01 | 5.0 | 53 | 0.379 | 426 | 4.1 | a The value of diethyl sulfoxide.

EXAMPLE 9

A mixture comprising 70 parts by weight vinyl acetate, 30 parts by weight of acetonitrile, and 0.01 part of 2,2′-azodiisobutyronitrile, was prepared. The said mixture was sealed in a tube and maintained at 60° C. for 48 hours. About 47 percent of the vinyl acetate was polymerized to polyvinyl acetate having about 1720 average degree of polymerization.

The product polyvinyl acetate was dissolved in methanol and converted to polyvinyl alcohol by alkaline alcoholysis employing sodium hydroxide catalyst. The polyvinyl alcohol thus obtained had a degree of polymerization of 1630.

A portion of said polyvinyl alcohol was dissolved in water to form an aqueous solution containing 15 percent by weight polyvinyl alcohol. This aqueous polyvinyl alcohol solution upon standing for ten days at 30° C. showed no tendency to gel.

EXAMPLE 10

A mixture comprising 40 parts by weight vinyl acetate, 60 parts of ethylene carbonate, and 0.02 part of 2,2'-azodiisobutyronitrile was prepared. The said mixture was sealed in a tube and polymerized for 3.5 hours at 60° C. About 4.9 percent of the vinyl acetate was polymerized to polyvinyl acetate having an average degree of polymerization of 2530.

The product polyvinyl acetate was dissolved in methanol and converted to polyvinyl alcohol by alkaline catalyzed alcoholysis employing sodium hydroxide catalyst. The said polyvinyl alcohol had an average degree of polymerization of 1720.

The polyvinyl alcohol thus obtained was dissolved in water to form a solution containing 15 percent by weight polyvinyl alcohol. After standing for ten days at 30° C., the said polyvinyl alcohol solution showed no evidence of gel formation.

The conditions and the relative relationships set forth in the examples are those preferred in carrying out the process of this invention, but it will be understood that other conditions and relationships may be used within the scope of the invention. In general, unless otherwise indicated, conventional operations and techniques are suitably employed.

It will also be understood that various changes and modifications in addition to those indicated above may be made in the embodiments herein described without departing from the scope of the invention as defined in the appended claims. It is intended therefore, that all matter contained in the foregoing description shall be interpreted as illustrative only and not as limitative of the invention.

This application is a continuation-in-part of copending application Serial No. 827,162, filed July 15, 1959, for Preparation of Polyvinyl Alcohol which issued as United States Patent No. 3,080,350 on March 5, 1963 and of copending application Serial No. 844,846, filed October 7, 1959, for Polymerization Process and Product which issued as United States Patent No. 3,111,508 on November 19, 1963.

We claim:

1. A process for preparing a polyvinyl ester homopolymer which is convertible by saponification to fully hydrolyzed polyvinyl alcohol which forms substantially non-gelling aqueous solutions which comprises, preparing said polyvinyl ester homopolymer by the homopolymerization of a vinyl ester monomer having the formula $CH_2=CHOCOR$, wherein R is a hydrocarbon radical selected from the group consisting of lower alkyl radicals and aryl radicals, said homopolymerization being conducted at a temperature of about 0° C. to about 100° C. and in the presence of a free radical polymerization catalyst and in the presence of a substantially anhydrous liquid reaction medium in which said vinyl ester monomer is soluble and consisting essentially of acetic anhydride, said acetic anhydride being present in an amount of about 15 to about 85 parts by weight per 100 parts by weight of the combined vinyl ester monomer and acetic anhydride.

2. A process according to claim 1 wherein said polyvinyl ester homopolymer is polyvinyl acetate prepared by the homopolymerization of vinyl acetate monomer.

3. A process for the preparation of fully hydrolyzed polyvinyl alcohol which forms substantially non-gelling aqueous solutions, which comprises, preparing a polyvinyl ester homopolymer by the homopolymerization of a vinyl ester monomer having the formula $CH_2=CHOCOR$, wherein R is a hydrocarbon radical selected from the group consisting of lower alkyl radicals and aryl radicals, said homopolymerization being conducted at a temperature of about 0° C. to about 100° C. and in the presence of a free radical polymerization catalyst and in the presence of a substantially anhydrous liquid reaction medium in which said vinyl ester monomer is soluble and consisting essentially of acetic anhydride, said acetic anhydride being present in an amount of about 15 to about 85 parts by weight per 100 parts by weight of the combined vinyl ester monomer and acetic anhydride, removing unreacted vinyl ester monomer from said reaction medium after said homopolymerization to obtain a mixture containing said prepared polyvinyl ester homopolymer and said acetic anhydride, and adding a saponification catalyst to said mixture and saponifying said polyvinyl ester homopolymer at a temperature above about 40° C. to convert said vinyl ester homopolymer to fully hydrolyzed polyvinyl alcohol.

4. A process according to claim 3, wherein said prepared polyvinyl ester homopolymer is polyvinyl acetate prepared by the homopolymerization of vinyl acetate monomer.

References Cited by the Examiner

UNITED STATES PATENTS

| | | | |
|---|---|---|---|
| 2,485,141 | 10/49 | Cornthwaite et al. | 260—91.3 |
| 2,649,435 | 8/53 | Stanin et al. | 260—91.3 |
| 3,080,350 | 3/63 | Imai et al. | 260—89.1 |

JOSEPH L. SCHOFER, *Primary Examiner.*

PHILIP E. MANGAN, JOSEPH R. LIBERMAN, WILLIAM H. SHORT, *Examiners.*